June 23, 1959 D. PALERMO 2,891,343
FISH LURE
Filed Dec. 10, 1957
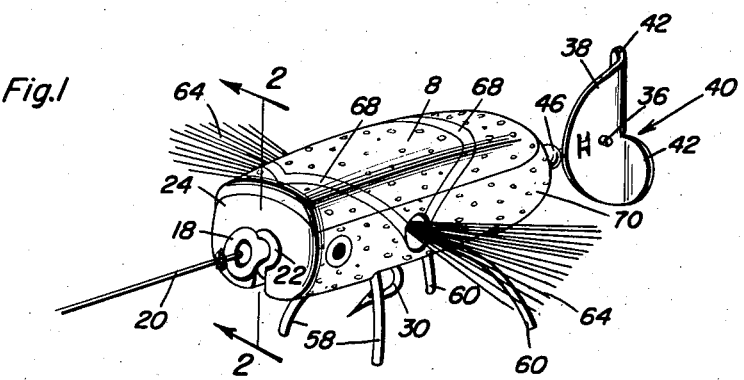
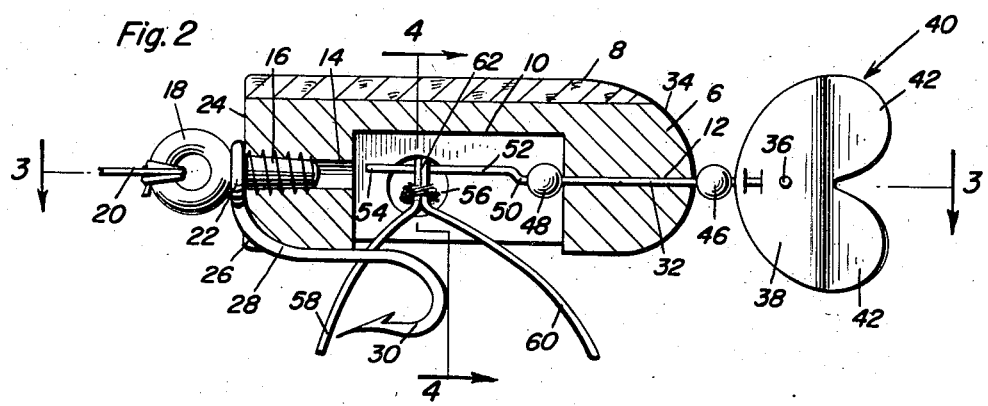
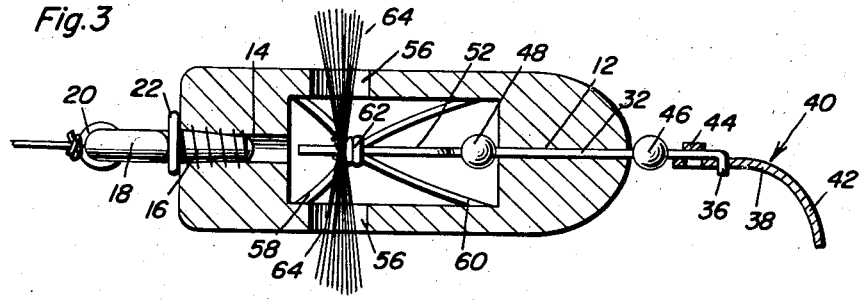
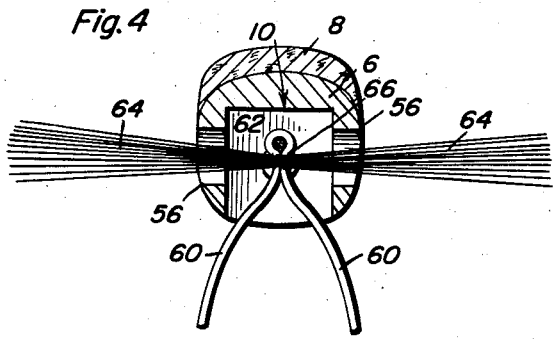
Dominic Palermo
INVENTOR.

United States Patent Office 2,891,343
Patented June 23, 1959

2,891,343

FISH LURE

Dominic Palermo, Chicago, Ill.

Application December 10, 1957, Serial No. 701,919

5 Claims. (Cl. 43—26.2)

The present invention relates to a fishing plug having a fish hook at the leading end and a tail-like spinner or propeller at the trailing end, and mechanically operated relatively movable components on its median portion and wherein all of the parts contribute to provide a practical and a highly efficient lure.

An object of the invention more specific than that touched upon is the provision of a shaft rotatably mounted on the plug and actuated by a spinner-like propeller and wherein a portion of the shaft suspends and actuates a plurality of depending legs which wiggle and vibrate. In addition, batches of elastic feelers or so-called animated "wings" project beyond diametrically opposite sides of the body or plug, whereby to provide an animated attractive bug.

Objects, features and advantages in addition to those specifically enumerated will become self-evident from the description of the details and the invention as claimed.

In the drawing:

Fig. 1 is a perspective view of a fishing lure constructed in accordance with the principles of the invention.

Fig. 2 is a view in section and elevation taken on the approximate line 2—2 of Fig. 1.

Figs. 3 and 4 are sections on the lines 3—3 and 4—4 respectively of Fig. 2.

Referring now to the drawing the plug which is also the body of the "lure" is of composite form and comprises the body proper 6 of suitable material, shape and dimensions. It is here shown as relatively short and generally non-circular in cross-section as seen in Fig. 4. On the top the body is provided with a lamination or layer of cork or the like 8 which is fitted in place and resembles a saddle. The surfaces of the cork 8 and body 6 are suitably painted or otherwise colorfully finished so that the "plug" in and of itself is satisfactory in attracting attention of a prospective fish. Centrally and in the bottom the body is provided with a substantially rectangular recess or pocket 10 and to the rear it has a bore 12 providing a bearing and at the front there is a larger bore 14. The tapered threaded shank 16 of a screw eye 18 is screwed into the bore 14. The eye 18 serves to accommodate a fishing line 20. The eye also serves as a retainer for the fish hook which is here shown with an eye 22 surrounding the shank and clamped between the eye 18 and the forward end 24 of the body. The lower forward end portion is provided with a keeper notch 26 which keys the arcuately bent portion 28 of the shank of the fish hook. The fish hook proper is of barbed construction as at 30 and underlies the forward half portion of the recess or pocket 10.

The aforementioned shaft has a linearly straight portion 32 which is mounted for rotation in the bearing and has a rear end portion extending beyond the rear end 34 of the body where it is provided with a laterally bent extremity 36 keyed in a hole provided therefor in the plate portion 38 of the propeller 40. The propeller comprises a simple plate or blade which is bifurcated and the furcations 42 are bent in opposite directions to provide appropriate propeller blades. The plate portion is struck out to provide a strap or retaining band 44. There is an end-thrust bead or the like 46 on the shaft and interposed between the propeller and the end 34 of the body. There is another bead 48 on the portion of the shaft in the recess and beyond this the shaft end is laterally bent at 50 to provide an offset or crank portion 52. The crank portion is confined in the recess and has an end portion 54 extending forwardly beyond diametrically opposite openings or holes 56 formed in the opposite side walls of the recess. Suitable flexibly resilient strands or pieces of appropriate plastic material are employed to provide forward and rearward dangling and wiggling legs 58 and 60. The legs are formed into an appropriate loop 62 which encircles the crank portion of the shaft so that the shaft rotating the attached loop serves to mechanically jiggle the wiggling legs 58 and 60. The legs also have attached thereto just below the loop a plurality of strands of oppositely projecting feelers, whiskers, or the like 64, the point of attachment being at 66 as seen in Fig. 4. These strands 64 may also be described as bucktail hairs, whiskers, vibratory wings or equivalent attention-getting elements. In any event, the side wings or feelers and legs are simultaneously agitated and activated to attract attention, the elements 64 projecting through and outwardly beyond the side holes or openings 56.

It is to be brought out that the opposite holes or openings 56 communicate with the space in the recess or pocket 10 so that it may be said that the recess means allows the projection or protrusion of the cooperating elements 58, 60 and 64 from within the pocket to the exterior and beyond the exterior surfaces of the body.

The construction is also such that the surfaces may be painted with dots or spots representing scales as at 70 in Fig. 1 and appropriate bands or lines 68 may also be applied by painting or otherwise to add to the over-all unique appearance of the lure.

The lure may be employed in running water, or still water. When in running water the water itself by striking the blades of the propeller will rotate the propeller and consequently the shaft. The turning of the shaft and the crank portion 52 which carries the legs 58 and 60 and feelers 64 brings the latter elements actively into play relative to the body and propeller in an obvious manner. By trolling the device in still water the trolling movement will impart the necessary action to the propeller to bring about operation of the shaft and elements mounted on the crank portion thereof.

Minor changes in shape, size, materials and rearrangement of parts may be resorted to in actual practice without departing from the spirit of the invention or the scope of the invention as claimed.

What is claimed as new is as follows:

1. A fishing device comprising a body having a forward end portion, a rearward end portion and an intervening intermediate portion, said rearward end portion being provided with a lengthwise bore constituting a bearing, said intermediate portion being recessed to provide a pocket and said pocket opening through the bottom of said intermediate portion, means on the forward end of the body for attachment of a fishing line thereto, a fishing hook carried by said body, a plurality of flexible elements, a shaft mounted in said bearing with a portion thereof extending into the pocket and connected with said flexible elements, and a propeller carried by and for operating said shaft, said shaft having its rear end extending beyond the rear end of the body and being laterally bent, said propeller comprising a plate secured to the laterally bent end of said shaft, said plate being bifurcated to provide blades and said blades being deflected in opposite directions to provide effective water activated vanes, said propeller serving to rotate the shaft, that portion of the shaft in said pocket having an offset crank, and said flexible elements being mounted on said crank.

2. The structure defined in claim 1 and wherein opposite sides of the pocket are provided with diametrically opposite openings, certain of said flexible elements extending outwardly through and beyond said openings.

3. The structure defined in claim 2, the forward portion of said body being provided with a bore, an eye screw having a screw-threaded shank screwed into said bore, a fish hook having a shank with an eye, said eye on said fish hook surrounding the shank of the screw and being secured between the eye of the screw and the forward end of the body, the forward end of the body having a notch therein and said fish hook having a bent shank portion keyed in said notch.

4. A fishing device comprising a body having a forward end portion, a rearward end portion and an intervening intermediate portion, said rearward end portion being provided with a lengthwise bore constituting an axial bearing, said intermediate portion being recessed to provide an open bottom pocket and the open bottom of said pocket opening unobstructedly through the bottom of said intermediate portion, means on the forward end of the body adapted for the attachment thereto of a fishing line and a fishing hook, a shaft mounted in said bearing with one end portion projecting beyond the rearward end portion of the body and the other end projecting and terminating within the confines of said pocket and being provided with a crank which is rotatable in said pocket, flexible elements mounted on said crank and having portions thereof depending and extending downwardly through the open bottom of the pocket, and a propeller operatively mounted on the projecting rearward end portion of said shaft and adapted to impart rotation to the shaft whereby the crank portion functions to jiggle and vibrate said flexible element.

5. The structure defined in claim 4 and wherein opposite sides of the intermediate body portion are provided with aligned holes, and a plurality of feelers disposed for operation in the respective holes and attached for operation to the crank portion of the shaft by way of said flexible elements.

References Cited in the file of this patent

UNITED STATES PATENTS

| | | |
|---|---|---|
| 978,290 | Heatly | Dec. 13, 1910 |
| 1,068,908 | Lane | July 29, 1913 |
| 2,244,032 | Timm | June 3, 1941 |
| 2,448,523 | Fibiger | Sept. 7, 1948 |